Feb. 23, 1937.  L. G. NICHOLSON  2,071,761
MOTORCYCLE DRIVING MECHANISM, DRIVE LINE, AND BRAKING MECHANISM
Filed July 27, 1934  6 Sheets-Sheet 3

INVENTOR.
Leslie G. Nicholson

Feb. 23, 1937.   L. G. NICHOLSON   2,071,761
MOTORCYCLE DRIVING MECHANISM, DRIVE LINE, AND BRAKING MECHANISM
Filed July 27, 1934    6 Sheets-Sheet 5

INVENTOR.
Leslie G. Nicholson

Patented Feb. 23, 1937

2,071,761

UNITED STATES PATENT OFFICE 2,071,761

MOTORCYCLE DRIVING MECHANISM, DRIVE LINE, AND BRAKING MECHANISM

Leslie G. Nicholson, St. Helena, Calif.

Application July 27, 1934, Serial No. 737,234

6 Claims. (Cl. 180—33)

An object of my invention is to provide an improvement over my patent, No. 1,936,606, allowed Nov. 28, 1933. The improvement consists in providing a worm and gear driving mechanism which will rotate a motor cycle driving wheel forward or rearward. This said improved driving mechanism will operate a vehicle of the type shown in above mentioned patent, as well as the motorcycle explained and shown in the accompanying specification and drawings.

My invention relates to improvements in a motorcycle which is provided with a worm and gear driving mechanism, having a drive shaft extending from the driving mechanism to a universal joint which is flexibly attached to the rearward end of the takeoff shaft which extends through the outer end of the takeoff gear box. The motorcycle is provided with horizontal frame members supported upon a single front and rear wheel traveling in horizontal alignment. The motorcycle is provided with a braking mechanism, a driving wheel, and a worm and gear driving mechanism which are resiliently journaled to the rear of frame.

The objects of my invention are:

First, to provide a motorcycle having horizontal frame members spaced an even width apart, having at the front of frame a vertical upward bend, converging to steering head and thereto attached. A radiator mounted between the frame members in the vertical upward bend, braking and worm and gear driving mechanism resiliently attached to rear of frame.

Second, to provide an improved motorcycle having a worm and gear driving mechanism whereby said worm and gear continuously operate in lubrication.

Third, to provide a motorcycle having an improvement, whereby the driving wheel may be detachably mounted between the brake and worm and gear driving mechanism, supporting the rear of frame resiliently.

Fourth, to provide a motorcycle having a worm and gear driving mechanism which is enclosed within a gear housing, having said gear housing substantially secured to the stationary plate at the inner end of bearing housing. A drive shaft extending forward from the driving mechanism to the universal joint, which is flexibly connected to the takeoff gear shaft.

Fifth, to provide a drive shaft housing having one end secured to the gear housing and the other end flexibly attached to the takeoff gear box.

Sixth, to provide a motorcycle having a gear housing wherein the driving worm mechanism may be mounted in the lower portion.

Seventh, to provide a motorcycle having the driving worm constructed stationary on the rearward end of the drive shaft, bearing means mounted on the drive shaft adjacent to the driving worm.

Eighth, to provide a motorcycle having a yoke encircling each bearing housing having a horizontal bar which is stationary with the lower portion of said yoke having one end attached to the spring means.

Ninth, to provide a motorcycle having adjustments whereby the braking and driving mechanisms may be moved laterally with respect to frame or longitudinally with respect to the takeoff gear box.

Tenth, to provide a motorcycle having a detachable fender encircling a portion of the driving wheel. A U-shaped fuel tank mounted astride the driving wheel.

Other objects of the invention will be apparent as the description proceeds in the accompanying specification. One form of the invention is illustrated in the accompanying drawings, in which.

Figures 1, 2, 2A, 3:
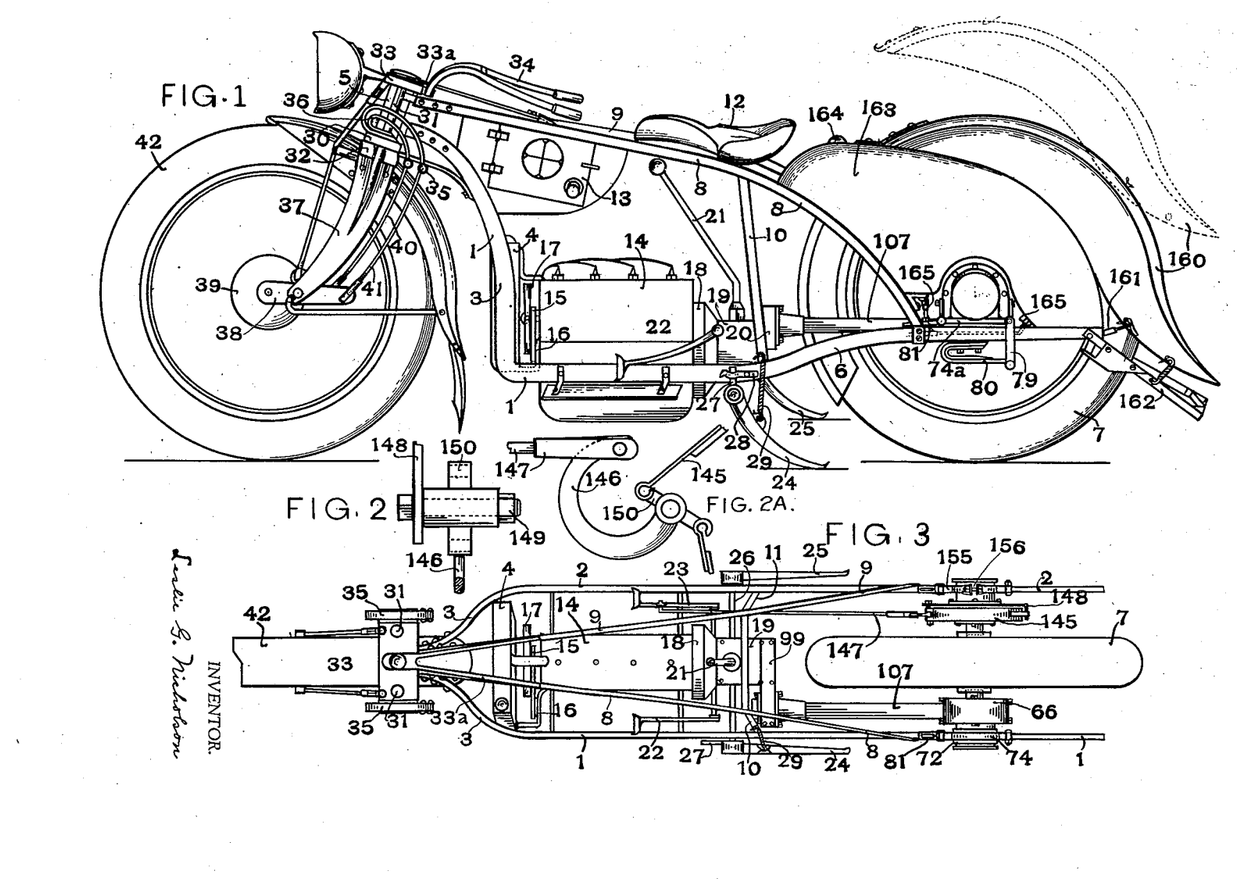
Fig. 1 is a vertical side view of the entire motorcycle.
Fig. 2 is a detailed view partly in vertical section of the mounting means for the brake lever which is operated by the foot brake.
Fig. 2A is a side elevation of the brake lever.
Fig. 3 is a plan view of the motorcycle having tank, fender, and handle bars removed.

Referring to the drawings: The frame of my improved motorcycle as shown in Figs. 1 and 3 comprises two horizontal frame members 1, 2 spaced an even width apart, having at the front an upward vertical bend 3 which parallels the radiator 4 which is mounted between the frame members 1, 2 forming an arch over top of radiator 4, converging to the steering head 5, and substantially secured thereto. The frame members 1, 2 extend horizontally rearward spaced an even distance apart from the vertical bend 3 having a rise at 6 and extending rearward embracing fully three quarters of the driving wheel 7.

The frame bracing bars 8, 9 form the upper part of the frame, having the forward ends substantially secured to the upper steering head bar, and extending rearward to bracing posts 10 and 11 paralleling the said frame members 1, 2, and from said posts 10, 11 the said bracing bars 8, 9 extend rearward and downward to a point forward of the braking and driving mechanisms, and securely attached to the frame members 1, 2. The bracing bars 8, 9 substantially support the vertical bend shown at 3 in frame members 1, 2, also bracing the central and rearward portions of the frame members 1, 2 very rigidly. The operator's seat 12 is supported between the bracing posts 10, 11. The radio 13 is attached to the forward end of the bracing bars 8, 9, also to frame members 1, 2. The radio may be operated from the driver's seat when the vehicle is in motion or when standing still.

The frame members 1, 2 may be swung lower to the ground if a lower center of gravity is needed for motor 14. Said motor is water cooled by radiator 4 which is secured between the frame members 1, 2 in the vertical bend 3. The water is circulated through the motor 14 by fan belt 15 which drives the water pump 16, and the fan 17, this forming a part of the cooling system. The clutch housing 18 is attached to the rear of the motor 14 as shown in Figs. 1 and 3. The transmission box is shown at 19, the takeoff gear box at 20, the gear shifting lever at 21, the clutch pedal at 22, the brake pedal 23. The takeoff gear box 20 is constructed stationary to the rear of the transmission box 19.

The supporting side arms 24, 25 are provided for supporting the vehicle in a vertical position when standing, and are non-turnably mounted on each outward end of the transverse shaft 26, which is journaled to the under portion of the frame members 1, 2. The side arms 24, 25 are pushed down in contact with the ground by the operator's foot, and held in contact with the ground by the lateral extension 27 of the side arm 24 which engages the catch 28 which is secured to the side of the frame member 1. The catch 28 may be released by the operator's foot and the side arms 24, 25 are automatically raised to their carrying position by coil spring 29, having one end hooked to the side arm 24 and the other end hooked to the bracing post 10.

In Figs. 1 and 3 the steering head 5 and the steering device used for steering the motorcycle are practically the same as shown in Patent, 1,952,091 to Nicholson, dated March 27, 1934. However, in this showing the lower bearing plate 30 has been extended beyond the steering device posts 31. The upper bearing plate 33 remaining the same, having the handle bar 34 mounted thereon, the forked yoke or bracing means 33a is attached to the bracing bars 8, 9. The U-shaped spring means 35, 36 are of the laminated type and are mounted to the lower bearing plate 30 on each outer end thereof, adjacent to each steering device post 31, the smaller spring means 36 being mounted inside of the larger U-shaped spring means 35. The spring means 35, 36 are the same on both sides of the vehicle and are interchangeable. The wheel fork 37 is securely mounted to the wheel fork plate 32 at the upper end and the lower end of the wheel fork 37 is pivotally attached to the front wheel attachment 38 near the center, the forward end being secured to the wheel hub 39, and the rearward end of said attachment 38 is pivotally connected to the spring rods 40, 41, and the upper ends of said spring rods 40, 41 are pivotally connected to the rearward ends of the spring means 35, 36. The steering wheel 42 travels in horizontal alignment with the driving wheel 7 supporting the front of the frame in a resilient manner.

Figures 4, 5, 6:
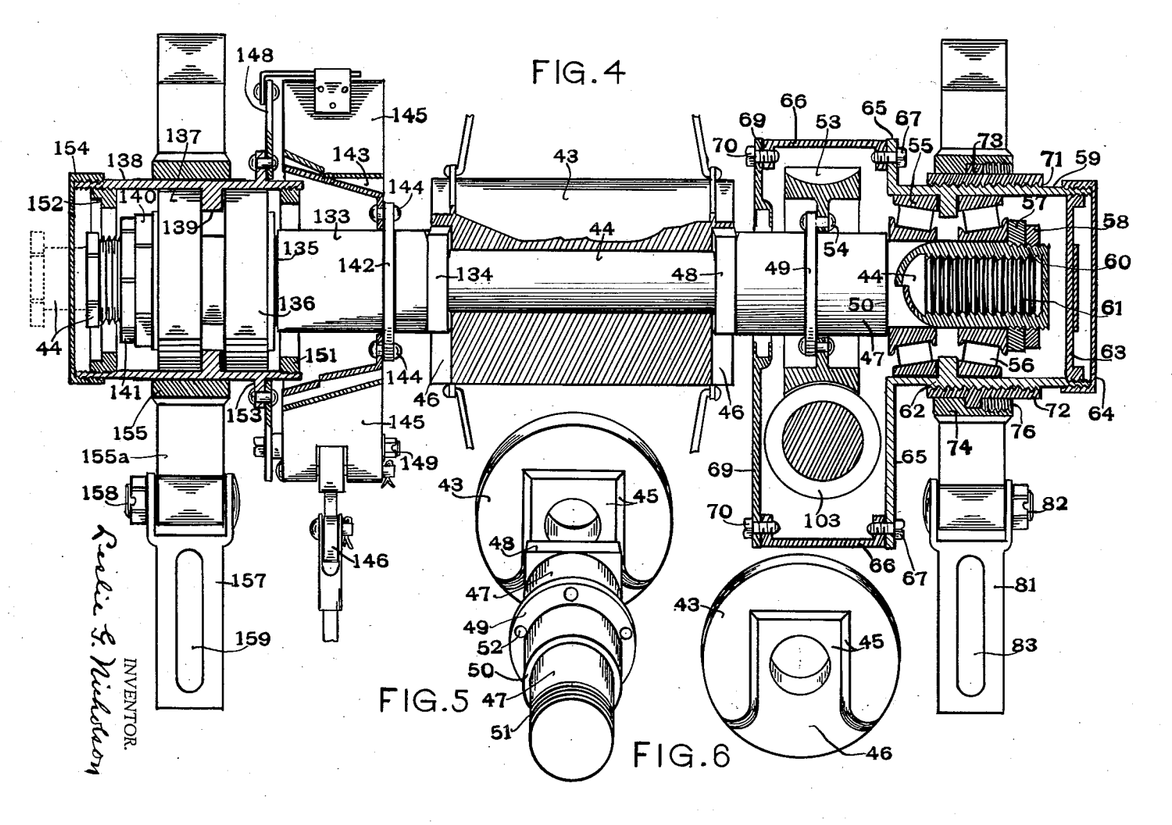
Fig. 4 is a detailed cross view of the braking and driving mechanisms and the driving wheel hub.
Fig. 5 is an end view of driving wheel hub showing the manner in which the squared section on end of cylinder member engages said hub.
Fig. 6 is taken from Fig. 5 showing the squared means in end of hub for receiving the squared section on end of cylinder member.

In Fig. 4 is shown a detailed cross view of the brake mechanism, the worm and gear driving mechanism and the driving wheel hub. The driving wheel 7 is mounted between the two said mechanisms in horizontal alignment with the steering wheel 42. The driving wheel hub 43 has a central opening therethrough for receiving the round axle bolt 44. At each end of the wheel hub 43 there is a square recess or squared means 45 embedded in the end of the said wheel hub 43, having three sides squared and the lower side or the lower portion 46 being removed, thereby providing an entrance to the squared means 45. See Figs. 5 and 6.

In Figs. 4 and 5 the cylinder member 47 is provided with a squared section 48 at the extreme inner end thereof, and between the stationary flange 49 encircling the cylinder member 47 and the squared section 48 that part of the cylinder member 47 is round, and the same applies to the cylinder member 47 between flange 49 and the outer end. The outward half of the cylinder member 47 is reduced to a smaller diameter than the inner half, thereby providing the shoulder 50 between the inner half and the outer half. The extreme outward end of the cylinder member 47 is provided with a threaded means 51.

The squared section 48 at the inner end of the cylinder member 47 contains four sides, all sides being of equal length, thereby forming the squared section 48 thereon. The square recess or squared means 45 embedded in each end of the wheel hub 43 conforms with the squared section 48 at the inner end of the cylinder member 47, thereby providing a firm engagement between the squared section 48 and the squared means 45. In Fig. 5 is shown the manner in which the squared means 45 embedded in end of hub 43 engages the square section 48 at the inner end of the cylinder member 47. In Fig. 4 the squared section 48 is shown firm in engagement with the squared means 45 embedded in the end of hub 43 and substantially secured firm in engagement by means of axle bolt 44.

Figures 7, 8, 9, 10, 11:
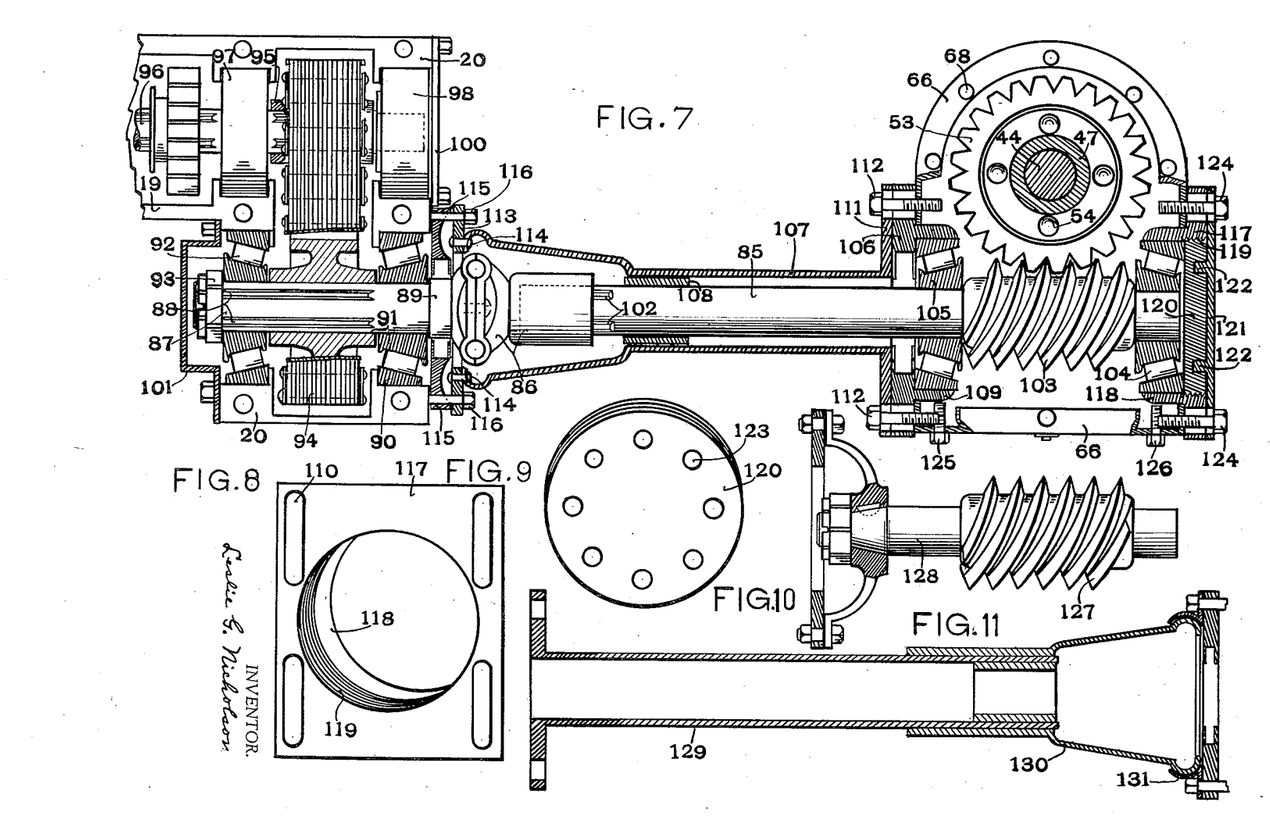
Fig. 7 is a detailed cross view of the gear housing showing the driving worm mechanism, the driving worm shaft, extending to the universal joint which is connected to another shaft extending through the outer end of the takeoff gear box.
Fig. 8 is an end view of the rear bearing container showing the bearing adjusting plug removed, also showing longitudinal adjustments at each corner whereby the bearing container may be adjusted upward or downward.
Fig. 9 is an end view of the bearing adjusting plug, showing a plurality of holes encircling said plug.
Fig. 10 is a modified view of driving worm.
Fig. 11 is a modified view of the drive shaft housing, showing a slip joint at one end.

In Fig. 5 the stationary flange 49 encircling the cylinder member 47 is provided with a plurality of bolt holes 52, whereby the worm gear 53 shown in Figs. 4 and 7 may be substantially secured to said flange 49 by means of bolts or rivets 54 for the purpose of rotating the cylinder member 47, which in turn rotates the driving wheel 7 forward or rearward whichever is demanded. In Fig. 4 the outward half of the cylinder member 47 which is reduced to a smaller diameter than the inner half extends centrally through the bearing means 55, 56, the bearing means 55 being mounted against the shoulder 50, and the adjusting nuts or locking nuts 57, 58 engage the threaded means 51 on the extreme outer end of the cylinder member 47, and when adjusted to the bearing means 55, 56 substantially and operatively secure the cylinder member 47 within bearing housing 59 and within the bearing means 55, 56.

In Fig. 4 the outward end of the cylinder member 47 shows parts broken away, thereby providing a detailed view of the threaded means 60 which is threaded on the inside of the cylinder member 47. The axle bolt 44 is provided with a threaded means 61 on the extreme end which is the same type of threaded means as 60, and by turning the axle bolt 44 the threaded means 61 on the end of said axle bolt 44 engages the threaded means 60, which is threaded within the cylinder member 47, thereby drawing the brake mechanism, and the driving mechanism into substantial engagement with the hub 43.

The bearing housing 59 is provided with a stationary flange 62 encircling the inside of the bearing housing 59, forming a division between the bearing means 55, 56, thereby separating the bearing means 55, 56 into separate bearing chambers within the bearing housing. The bearing means 55, 56 are mounted on the outward half of the cylinder member 47 and on each side of the flange 62, and by adjusting and locking the nuts 57, 58 against the bearing means 55, 56 the cylinder member 47 is operatively secured within the bearing housing 59. At the outward end of the bearing housing 59 is a disk grease stop 63 which is threaded in the outward end of the bearing housing 59. On the extreme outward end of the bearing housing 59 a dust cover 64 is threaded thereon.

The bearing housing 59 is provided with a stationary plate 65 at the inner end thereof, which conforms to the curvature and shape of the gear housing 66, substantially supporting the gear housing 66, which is firmly secured to the plate 65 by means of cap screws 67. The plate 65 is provided with a plurality of bolt holes which conform to and are in alignment with the threaded holes 68 in the gear housing 66. See Fig. 7. On the opposite side of the gear housing 66 another plate 69 is provided which conforms to the curvature and shape of the gear housing 66, and is firmly secured to the gear housing 66 by means of cap screws 70 thereby enclosing the opposite side of the gear housing 66. Each side of the gear housing 66 is constructed in the same manner, and each side having the same number of holes which are in alignment with the holes on the opposite side whereby the plate 65 may be attached to either side of the gear housing 66. See Fig. 20.

The bearing housing 59 is provided with a threaded means 71 which is on the outside of the bearing housing 59, intermediate the plate 65 and the outward end of said housing. The sleeve 72 is threaded on the inside having the same type of threaded means as 71 on the bearing housing 59, and the sleeve 72 is threaded on the bearing housing 59 engaging the threaded means 71. See Fig. 15. The sleeve 72 is provided with a stationary flange 73 which encircles the outside of the sleeve 71 near the center.

The yoke 74 is pivotally mounted upon the sleeve 72, having at its center a grooved means 75 encircling the inside of the yoke 74 which engages the flange 73 encircling the outside of the sleeve 72. See Figs. 15, 16. The yoke 74 is adjusted upon the sleeve 72 to the flange 73 by means of the threaded rim 76 which is threaded inside of the yoke 74 from the outward side, thereby preventing lateral movement of the yoke 74 upon the sleeve 72 when the vehicle is in motion. See grooved means 75 and rim 76 in Fig. 16. The sleeve 72 provides the lateral adjusting means with respect to the frame members 1, 2 for the brake mechanism, the driving wheel 7, and the driving mechanism. By turning the sleeve 72 inward or outward upon the bearing housing 59 adjusts the driving wheel 7 in horizontal alignment with the steering wheel 42, and the driving mechanism and the drive line are adjusted with respect to the takeoff gear box 20 in the same manner.

Figures 12, 13:
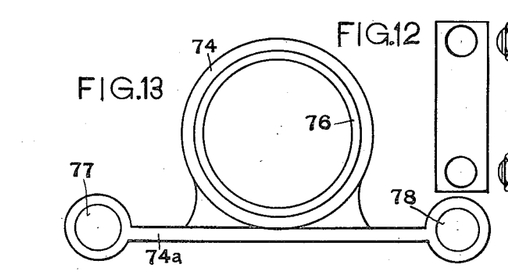
Fig. 12 is a spring shackle which connects spring means to the rear of the horizontal bar.
Fig. 13 is a side view of yoke mounted on bearing housing in the driving mechanism, showing the horizontal bar at the bottom.
Figures 23, 24, 25:
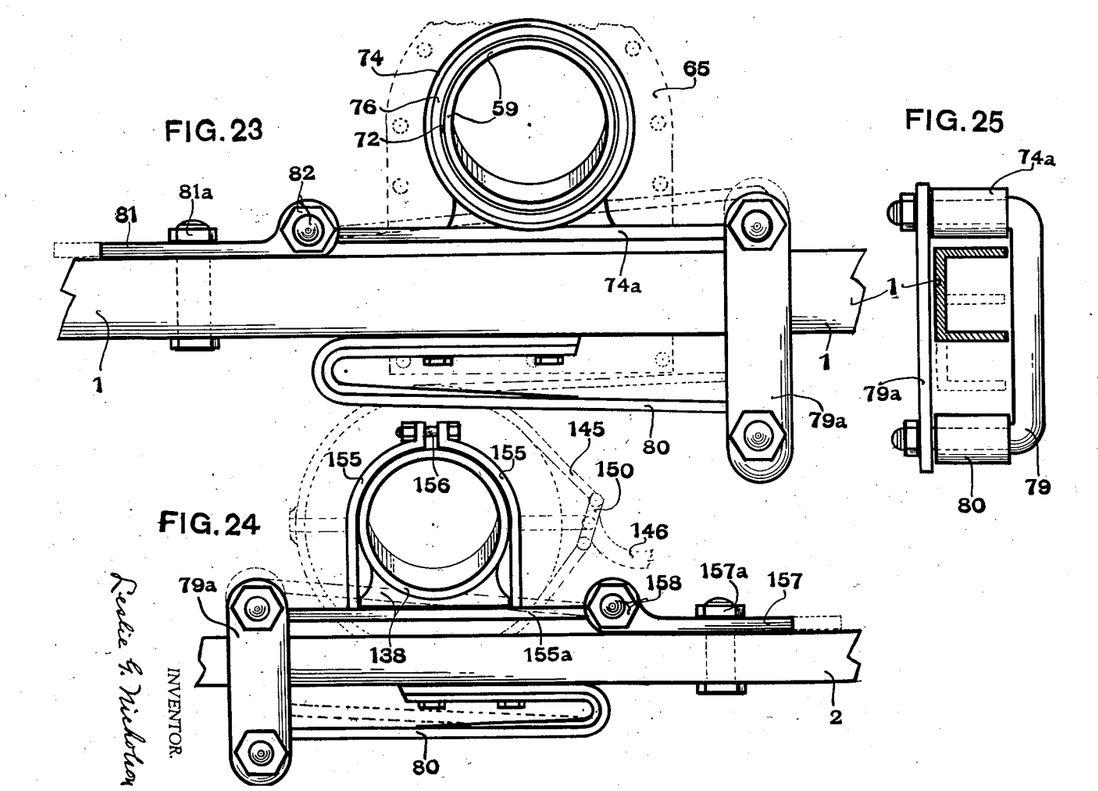
Fig. 23 is an enlarged view of bearing housing, horizontal bar, frame and spring means.
Fig. 24 is an enlarged view of the opposite bearing housing showing brake means, bearing housing, horizontal bar, frame and spring means.
Fig. 25 is an end view showing horizontal bar shackled to the spring means.

In Figs. 13 and 23 is shown a side view of the yoke 74 and the rim 76, and at the bottom of the yoke 74 is a horizontal bar 74a which is stationary with the upper part 74 and included as a member of the yoke 74. Each end of the bar 74a is provided with a round opening therethrough 77 and 78, the said opening 78 provides means whereby the upper end of the spring shackle 79 and plate 79a may be pivotally mounted in the opening 78 having the lower end of the spring shackle 79 pivotally mounted to the U-shaped spring means 80. See Fig. 1. The type of spring shackle 79 shown in Figs. 12 and 25 may be of sufficient length to extend from the opening 78 in the horizontal bar 74a to the U-shaped spring means 80. The forward opening 77 provides means whereby the forward end of the horizontal bar 74a may be pivotally connected to the horizontal bar yoke 81 by means of the bolt nut 82. In Fig. 4 the horizontal bar yoke 81 is provided with an oblong slotted means 83, which extends longitudinally with the frame member 1, thereby providing a longitudinal adjusting means, whereby the driving mechanism may be adjusted forward or rearward with respect to the takeoff gear box 20.

As shown in Figs. 1, 4, and 23, the horizontal bar yoke 81 is substantially bolted to the frame member 1 by bolting means 81a when adjustments have been made between the driving mechanism and the takeoff gear box 20. It is now plain that the yoke 74 is resiliently and adjustably attached to the frame member 1, and by mounting the yoke 74 on sleeve 72 provides a pivotal movement between the bearing housing 59 and the yoke 74 when the vehicle is in action.

Figures 15, 16, 17, 18, 19:
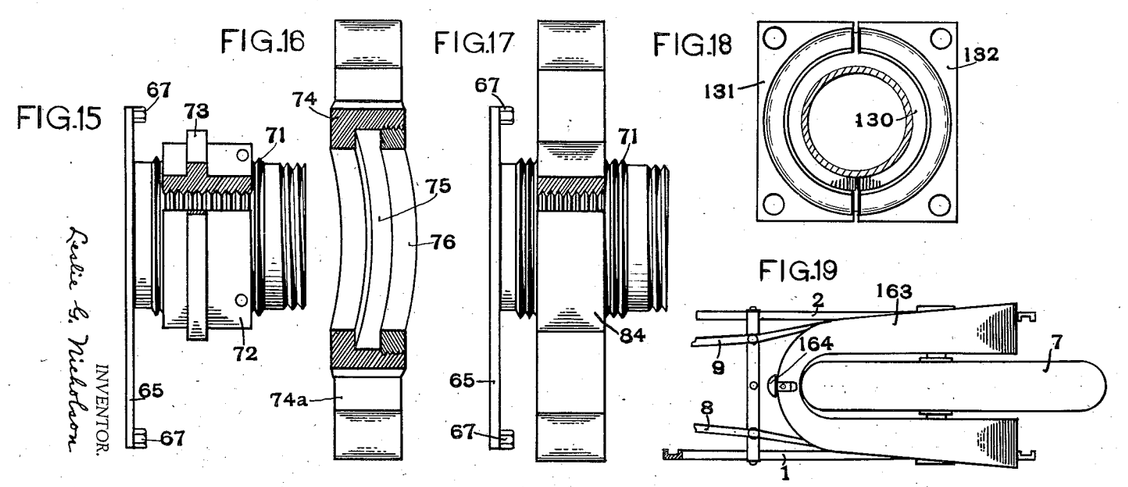
Fig. 15 is a view of the threaded sleeve threaded on the bearing housing in the driving mechanism, showing the stationary flange encircling said sleeve.
Fig. 16 is a cross section view of yoke which is mounted on the sleeve shown in Fig. 15, showing the grooved means at the center.
Fig. 17 is a modified view showing a yoke threaded on the bearing housing replacing the said threaded sleeve.
Fig. 18 is taken from Fig. 11 showing the manner in which the forward end of housing is attached to the takeoff gear box which allows pivotal motion for said housing.
Fig. 19 is a sectional view of the vehicle, showing fuel tank which is U-shaped mounted astride the driving wheel.

In Fig. 17 the yoke 84 is a modified showing of the yoke 74. In this showing the sleeve 72 has been removed from the bearing housing 59, and the yoke 84 is directly threaded on the bearing housing 59. The horizontal bar of the yoke 84 is the same type as the horizontal bar 74a and may be interchangeably mounted to the horizontal bar yoke 81 and to the spring means 80 in the same manner as bar 74a. The yoke 84 when threaded on the bearing housing 59 in this manner provides pivotal means between the yoke 84 and the bearing housing 59 when the vehicle is in action. Lateral adjustments of the driving mechanism with respect to the frame are made by disconnecting each end of the bar 84a and threading the yoke 84 in or out on the bearing housing 59.

In Fig. 7 is a detailed cross view of the driving worm mechanism showing the drive shaft 85 extending forward from said mechanism connecting with the universal joint 86, which is flexibly attached to the rearward end of the splined shaft 87 extending through the outer end of the takeoff gear box 20. The shaft 87 is provided with a splined means 88 and at the rearward end is a shoulder 89, which the bearing means 90 is mounted against. The shaft 87 extends centrally through the bearing means 90, and the splined chain gear 91, which engages the splined means 88, and extending on through the forward bearing means 92. The chain gear 91 which engages the splined means 88 is mounted on the shaft 87 in a non-turnable manner between the bearing means 90 and 92, and the shaft 87 is operatively adjusted to the bearing means 90 and 92 by means of the nut 93, which is threaded on the forward end of shaft 87.

The silent chain 94 is an endless chain and encircles the chain gear 91, which is mounted on shaft 87, and the chain gear 95 which is mounted on the outward end of the sliding gear shaft 96, and between the bearing means 97 and 98. The silent chain 94 is driven through the medium of the sliding gear shaft 96 when the motor power is applied. The said silent chain 94 continuously functions in lubrication as does the bearing means 90, 92 and the bearing means 97, 98.

The takeoff gear box 20 is constructed stationary to the rear of the transmission box 19, having a grease-tight covering 99 which is removable. The bearing plate 100 is secured to the rear of the takeoff gear box 20, and when removed the bearing means 98 may be removed from the bearing housing 20. The bearing covering 101 is secured to the front of the takeoff gear box 20, and when removed provides means whereby the adjusting nut 93 may be adjusted or removed from shaft 87.

The driving worm mechanism is mounted in the lower portion of the gear housing 66, thereby providing a lower center of gravity for the drive shaft 85, and for the transmission box 19, and for the motor 14. The forward end of the drive shaft 85 is provided with a splined means 102 which engages like means in the universal joint 86, and at the rearward end of shaft 85 the driving worm 103 is constructed stationary thereon. The extreme rearward end of the drive shaft 85 is mounted in the bearing means 104, and the forward end of the drive shaft 85 is of sufficient length to reach from the driving worm 103 to the universal joint 86. The forward end of the drive shaft 85 extends centrally through the bearing means 105, and the bearing container 106, and the drive shaft housing 107, and the bronze bearing means 108 which is mounted in the forward end of the drive shaft housing 107, and the extreme forward end of said drive shaft 85 engages the splined means in the universal joint 86.

The forward bearing container is provided with a plate 106 having a round central opening therethrough, which is grooved for mounting felt packing therein, thereby providing a grease stop. The plate 106 has a lateral extension 109 wherein the bearing means 105 is mounted. The plate 106 is provided with an oblong opening at each corner, whereby longitudinal adjustments may be made of the bearing container 106 with respect to properly meshing the driving worm 103 with the worm gear 53. In Fig. 8 the oblong opening 110 is shown at each corner and the oblong openings in the plate 106 are the same type.

The rearward end of the drive shaft housing 107 is provided with a plate 111 conforming in size to plate 106, and having the same type of an oblong opening 110 at each corner as does plate 106, and resting against the plate 106, whereby each said plate 106 and 111 are substantially secured to the gear housing 66 by means of cap screws 112 which extend through the oblong openings 110 and threading into the gear housing 66.

The drive shaft housing 107 is constructed in one continuous piece, having no slip joint, and at the forward end of the drive shaft housing 107 there is provided a bronze bearing means 108 which is mounted therein for the purpose of steadying or supporting the forward end of the drive shaft 85. The drive shaft housing 107 at the forward end is bell shaped, thereby forming a housing over the universal joint 86. The extreme forward end of the housing 107 is secured to the rubberized fabric plate 113, which provides flexibility between the drive shaft housing 107 and the takeoff gear box 20. The plate 113 which is rubberized fabric is the same material as rubberized belting or the like, and is riveted at 114 to the forward end of housing 104, thereby forming the back of the bearing plate 115, and is secured to the takeoff gear box 20 by means of cap screws 116. The grease stop plate 115 may be dished out forward of the riveted means 114, which allows a little more room for the flexibility of housing 107.

The rearward bearing container is constructed in a little different manner from the forward bearing container 106. The rearward bearing container is provided with a plate 117, having a lateral extension 118, wherein the bearing means 104 is mounted. The plate 117 is provided with a central opening therethrough which is the same in diameter as the bearing means 104. The said central opening through plate 117 is provided with a threaded means 119 which engages the same type of threaded means as provided on the outside of the adjusting plug 120. The said adjusting plug 120 is threaded into plate 117, butting against the rear of the bearing means 104, thereby forming the back of the bearing seating means, and by turning the adjusting plug 120 in or out of the threaded central opening adjusts the bearing means 104, 105 to the driving worm 103 and the driving shaft 85, thereby taking up any end play. In Fig. 8 an end view is shown of plate 117 showing the central opening and the threaded means 119 therein. In Fig. 9 an end view is shown of the adjusting plug 120.

For the prevention of any endwise movement of the driving worm 103 or the drive shaft 85, the adjusting plug 120 is provided for the purpose of adjusting the bearing means 104, 105 properly and operatively upon the drive shaft 85, and against the driving worm 103. The adjusting plug 120 threads in or out of said central opening in plate 117 as mentioned, and when turned inward against the bearing means 104, prevents end play or endwise movement and operatively adjusts the bearing means 104, 105 against the driving worm 103, upon the drive shaft 85. When the proper adjustments of the bearing means 104, 105 have been maintained against the driving worm 103, the adjusting plug 120 is substantially secured in the proper adjusted position by means of a locking plate 121.

When the bearing means 104, 105 have been properly adjusted upon the drive shaft 85 to the driving worm 103, the adjusting plug 120 is substantially secured and held in the adjusted position by means of the locking plate 121 having two laterally extending prongs 122 at the center of the plate 121, which are in horizontal alignment with holes 123 in the rear of the adjusting plug 120, and said prongs 122 engage said holes 123 in the rear of the plug 120. The adjusting plug 120 is provided with a plurality of holes as shown in Fig. 9 at 123, which encircle the rear of the adjusting plug 120 at intervals, and in horizontal alignment with prongs 122. The plate 121 rests against the rear of the bearing container or plate 117, conforming in size to plate 117, having an oblong opening 110 at each corner thereof, and each plate 117 and 121 is securely held in place by means of cap screws 124 which extend through the upper and lower oblong openings 110, and threading into the gear housing 66, thereby substantially securing the plate 121 and the bearing container 117 to the gear housing 66.

The plate 121 and the bearing container or plate 117 is provided with oblong openings 110 at each corner through which the cap screws 124 extend, whereby longitudinal adjustments of plate 121 and the bearing container 117 may be made in the same manner as the front bearing container 106 with respect to properly meshing the driving worm 103 with the worm gear 53. It should be understood that the gear housing 66 is provided with an opening for receiving the lateral extensions 109 and 118. These openings are slightly oblong thereby providing space for longitudinal adjustments of the bearing containers 106 and 117. Means are provided whereby an accurate adjustment may be obtained between the driving worm 103 and the worm gear 53 through the medium of the set screws 125, 126, which are threaded through the bottom portion of the gear housing 66 and extending upward to the inner end of the lateral extension 109 of the bearing container 106 and the lateral extension 118 of the bearing container 117. The set screws 125, 126 are arranged to turn upward or downward in the gear housing 66, thereby raising or lowering the driving worm mechanism within the gear housing 66, whereby a proper meshing of the driving worm 103 may be obtained with the worm gear 53. See Fig. 21 oblong opening in housing 66.

It is plain that the driving worm mechanism is operatively and adjustably mounted in the lower portion of the gear housing 66, and the said driving worm mechanism is not disturbed or moved out of adjustment in any manner when the gear housing 66 is detached and removed from the plate 65, and the forward end of the drive shaft housing 107 has been detached from the takeoff gear box 20. Each side of the gear housing 66 is designed and constructed in the same manner, and if necessary the plate 69 may be mounted on either side of said gear housing 66.

In Fig. 10 is shown a modified form of driving worm 127 which is constructed stationary on shaft 128 in the same manner as the driving worm 103 is constructed on shaft 85, but the length of the shaft 128 has been reduced and is much shorter in length than shaft 85. The removing of the drive shaft housing 107 from the driving worm mechanism affords facility whereby the driving worm 127 may be interchanged with the driving worm 103, thereby providing a worm and gear driving mechanism which will operate on other inventions on two-wheeled vehicles which the inventor has protected.

In Fig. 11 is shown a modified drive shaft housing 129 having the forward end 130 telescoping one end of housing 129 thereby providing a slipjoint between the two said housings. The forward end of housing 130 is flexibly connected to gear box 20 by means of two plates 131 and 132, which conform to the curvature of the housing 130 and are secured to the takeoff gear box 20. See Fig. 18. The housings 129 and 130 are interchangeable with the housing 107.

In Fig. 4 is shown a detailed cross view of the braking mechanism, which is provided with a cylinder member 133, having a squared section 134 at the inner end thereof, which engages the squared means 45 embedded in the end of the driving wheel hub 43. The outward half of the cylinder member 133 is reduced to a smaller diameter than the inner half, thereby providing the shoulder 135 between the outward half and the inner half. The bearing means 136, 137 are mounted in the bearing housing 138 on each side of the stationary flange 139 encircling the inside of the bearing housing 138, and the reduced end or the outward end of the cylinder member 133 extends centrally through the bearing means 136, 137, and operatively adjusted to said bearing means 136, 137 by the adjusting nuts or locking nuts 140, 141 which are threaded on the extreme outward end of the cylinder member 133, thereby substantially securing the cylinder member 133 in the bearing means 136, 137, and at the same time substantially and operatively securing the bearing means 136, 137 within the bearing housing 138.

The stationary flange 142 encircling the cylinder member 133 is provided with a plurality of holes whereby the brake drum 143 may be substantially secured to the flange 142 by means of rivets 144, thereby continuously rotating forward or rearward with the cylinder member 133, and checking the speed of the vehicle when the brake band 145 is applied by the foot brake 23. In Fig. 2A is shown the type of brake lever which may be used to manipulate the brake band 145 when the foot brake 23 is applied. The brake lever 146 is pivotally attached to one end of rod 147, having the other end pivotally attached to foot brake 23, while the opposite end of the brake lever 146 is pivotally secured to the brake support 148 by means of bolt 149, and at the center is a stationary laterally extending arm 150 which is pivotally connected with each end of the brake band 145.

The bearing housing 138 is provided with a grease stop 151 at the inner end and another grease stop 152 at the outer end which are threaded inside of the housing 138. At the rearward end of bearing housing 138 is a stationary flange 153 encircling the outside of said bearing housing 138, having a plurality of holes to which the brake support 148 is substantially secured in a non-turnable manner, and at the outer end of the housing 138 the dust cover 154 is threaded thereon.

Figures 12A, 14:
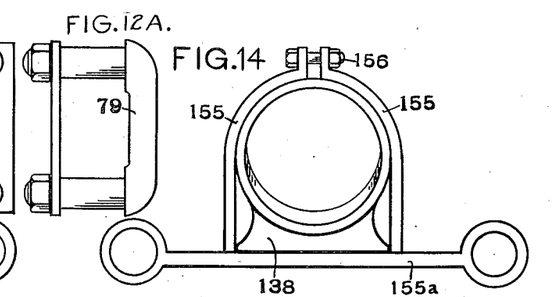
Fig. 12A is the removable yoke plate mounted on spring shackle.
Fig. 14 is a side view of the yoke which is mounted on the bearing housing in the brake mechanism; showing the clamping bolt extending through the top portion of yoke.

The yoke 155 is shown mounted in place upon the bearing housing 138, having a horizontal bar 155a which is stationary to the lower portion of yoke 155. See Figs. 14 and 24. The yoke 155 is mounted on the bearing housing 138 in a non-turnable manner, substantially securing and preventing any pivotal movement of the brake housing 138. The upper portion of the yoke 155 conforms to the curvature of the bearing housing 138, and the yoke 155 at top center is cut in two, thereby providing a clamping means when the adjusting bolt 156 which extends through the top portion of the yoke 155 has been tightened, thereby substantially securing the bearing housing 138 in a non-turnable manner. The bottom portion of the yoke 155 conforms to the squared part of the bearing housing 138, and when bolt 156 has been tightened prevents any possible means of the bearing housing 138 from turning within the yoke 155, and by loosening the bolt 156 provides means for lateral adjustment of the braking mechanism with respect to frame, The bearing housing 138 may be slipped inward or outward through yoke 155 when bolt 156 has been loosened.

The forward end of the horizontal bar 155a is pivotally attached to the horizontal bar yoke 157 by the bolt 158, and adjustably secured to frame member 2 by the bolting means 157a, the rearward end of the horizontal bar 155a is pivotally yoked to the U-shaped spring means in the same manner as shown at the opposite side or as shown in Fig. 24. The horizontal bar yoke 157 is provided with slotted means 159 which extends longitudinally with the frame member 2, thereby providing a longitudinal adjustment means, whereby the braking mechanism may be adjusted forward or rearward with respect to the takeoff gear box 20. The horizontal bar yoke 157 is substantially bolted to the frame member 2 when adjustments have been made between the braking mechanism and the takeoff gear box 20.

The cylinder member 133 is provided with a central opening therethrough for receiving the axle bolt 44, which extends centrally through the cylinder member 133, the wheel hub 43, and turning into engagement with the threaded means 60 which are on the inside of the cylinder member 47. By tightening the axle bolt 44 against the end of cylinder member 133, presses or draws the cylinder members 133, 147 firm against each end of hub 43 in the squared means 45, substantially securing and interlocking said cylinder members 133, 147 firm in place, and supporting the cylinder members 133, 147 in horizontal alignment.

When the vehicle is in action cylinder member 133, the wheel hub 43, the cylinder member 47, and the axle bolt 44 function simultaneously together, the axle bolt 44 revolving with said members. The axle bolt 44 may be turned out of engagement with the cylinder member 47, and removed endwise from hub 43 and cylinder member 133, thereby freeing the hub 43 from said cylinder members, allowing the driving wheel 7 to be removed perpendicularly from the vehicle.

In Fig. 1 the fender 160 encircling a portion of the driving wheel 7 is a detachable fender, and may be very quickly removed by loosening the catches 161 on each side of said fender. The fender may be lifted from the vehicle permitting the driving wheel 7 to be removed or replaced in a perpendicular manner, and by releasing and pressing the stand rack 162 into service the vehicle is supported in a vertical position. In the dotted-line drawing is shown the fender 160 removed. In Figs. 1 and 19 are shown different views of the U-shaped fuel tank 163, which is mounted astride the driving wheel 7, having the extreme rearward portion secured to the frame members 1 and 2, and the forward portions rest upon and are secured to the bracing bars 8 and 9. At the extreme top of tank 163 is a removable cap 164, and by removing said cap 164 the tank 163 may be filled with motor fuel. At the bottom portion of tank 163 is an outlet pipe 165 which leads to the power plant 14. There is an outlet of the same type as 165 on the opposite side of the vehicle, and in the same position on the tank 163 which joins the outlet pipe 165 on this side of the vehicle, thereby keeping the fuel level in the tank 163 the same on each side.

Figures 20, 21, 22:
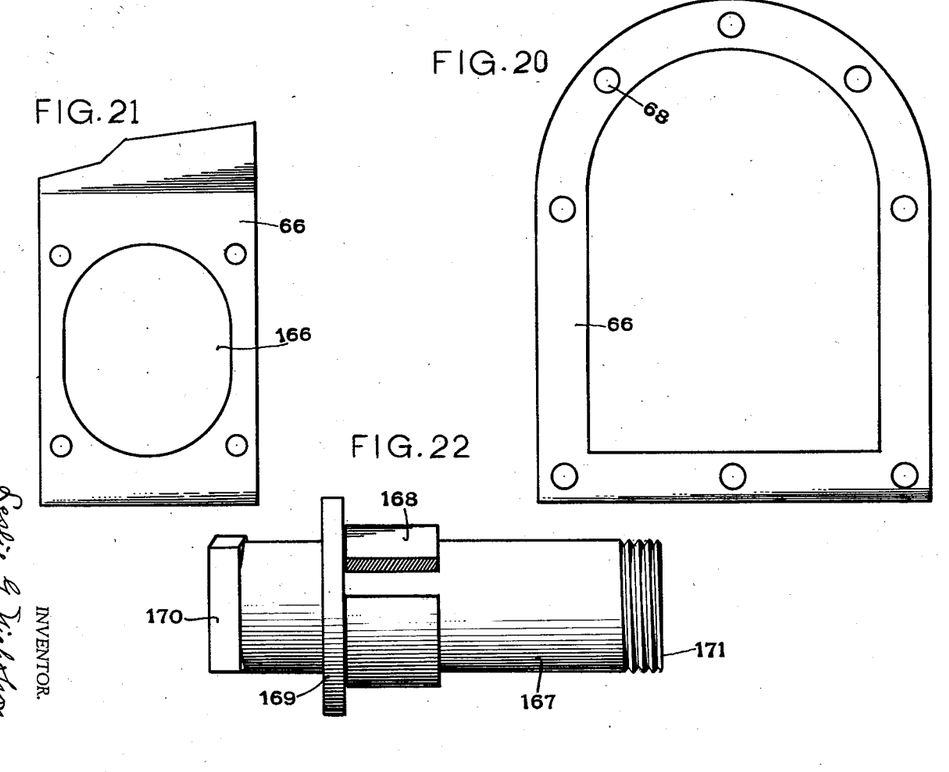
Fig. 20 is a side view of the gear housing.
Fig. 21 is an end view of a portion of the gear housing showing the oblong opening. An opening of the same type is at the front and the rear of said gear housing through which the bearing containers extend.
Fig. 22 is a modified view of cylinder member, the rounded portion having an even surface throughout its length. A spacing means is mounted on the cylinder member resting against the flange.

In Fig. 20 is shown a side view of the gear housing 66 and the position of the holes 68 at the top and bottom. In Fig. 21 is an end view of the gear housing 66, plainly showing the oblong opening 166, which is provided at the front and rear of the gear housing 66, whereby the bearing containers 106 and 117 may be adjusted longitudinally.

In Fig. 22 is shown a modified view of cylinder member 167, having a tubular spacing means 168, which slips over the outside of cylinder member 167, resting or butting against the stationary flange 169 which encircles the said cylinder member 167. The opposite end of the spacing means 168 butts against the bearing means which may be mounted on the outward end of the cylinder member 167 in the same manner as shown in Fig. 4. The cylinder member 167 is smooth and round between the flange 169 and the outward end thereof, the diameter of the rounded portion being of an equal width throughout its length, the inner end of the cylinder member 167 is provided with a squared section 170, which is the same type of squared section as shown at 48 on the inner end of the cylinder member 47. The extreme outward end of the cylinder member 167 is provided with a threaded means 171. It is plain that the rounded portion of the cylinder member 167 is provided with an even surface and differs in that respect from the cylinder member 47. The cylinder member 167 is mounted in the bearing housing 59 in the same manner as the cylinder member 47. The spacing means 168 replaces the shoulder 50 which is shown at the center of the cylinder member 47. The spacing means 168 may of sufficient width or length to supply the needed demand when mounting the cylinder member 167 in the said bearing housing 59.

What I claim and desire to secure by Letters Patent is:

1. A motorcycle including a frame; a steering and a driving wheel adapted to support the front and rear ends of said frame respectively; a brake drum and a driving gear arranged on opposite sides of said drive wheel and rotatable therewith; braking means in operative relation to said drum; a gear housing enclosing said driving gear and mounted on said frame; a takeoff gear box on said frame having a power shaft in longitudinal alignment with said gear housing; a drive shaft extending from said gear housing toward said takeoff gear box; a flexible joint fixed on said takeoff power shaft and having spline means engaging said drive shaft; a worm fixed on said drive shaft adapted to mesh with said gear; a drive shaft housing fixed on said gear housing extending toward said takeoff gear box; and a flexible fabric plate leaving a central opening therethrough and riveted to the end of said drive shaft housing adjacent said opening and having its margins bolted to said takeoff gear box.

2. A motorcycle including a frame; a steering and a driving wheel adapted to support the front and rear ends of said frame respectively; a brake drum and a driving gear arranged on opposite sides of said driving wheel and rotatable therewith; braking means in operative relation to said drum; a gear housing enclosing said driving gear and mounted on said frame; a takeoff gear box on said frame having a power shaft in longitudinal alignment with said gear housing; a drive shaft extending from said gear housing toward said takeoff gear box; a flexible joint fixed on said takeoff power shaft and having spline means engaging said drive shaft; a worm fixed on said drive shaft adapted to mesh with said gear; a drive shaft housing consisting of a tubular portion fixed to said gear housing and extending toward said takeoff gear box; an intermediate section enclosing said flexible joint and telescoping over said tubular portion and a spheroidal portion fixed to said takeoff gear box and engaging a similar surface on said intermediate section.

3. A motorcycle including a frame including a pair of interspaced members at the rear thereof; a steering wheel and a driving wheel supporting the front and rear ends of said frame respectively; means for mounting the driving wheel including a pair of bearing housings mounted on said interspaced members; a pair of cylinder members extending into said bearing housings and having opposed squared ends; bearings interposed between said cylinder members and said housings; a gear on one of said cylinder members; a housing enclosing said gear and fixed on one of said bearing housings; driving means engaging said gear; a brake drum fixed on the other cylinder member; braking means in operative relation to said drum; a hub on said driving wheel interposed between said cylinder members and having squared recesses open at one side adapted to receive the squared ends of said cylinder members; and a bolt securing said cylinder members to said hub.

4. A motorcycle including a frame including a pair of interspaced members at the rear thereof, a steering wheel adapted to support the front end of said frame, a pair of horizontal bars having one end pivoted on said interspaced frame members and movable with respect thereto, U-shaped spring means interposed between the free ends of said bars and said frame and adapted to control the movements of said horizontal bars, housings mounted on said horizontal bars, bearings in said housings, a driving wheel mounted in said bearings, and power transmission and braking means associated with said driving wheel.

5. A motorcycle including a pair of interspaced members at the rear thereof, a steering wheel supporting the front end of said frame, a pair of horizontal bars having one end pivoted on said interspaced frame members and movable with respect thereto, spring means interposed between the free ends of said bars and said frame and adapted to control the movement of said bars, a yoke mounted on one of said horizontal bars, a sleeve having an annular flange enclosed in said yoke, a rim threaded in said yoke and abutting said flange, a bearing housing threaded in said sleeve, a split yoke fixed on the opposite horizontal bar, a bearing housing in said yoke, a bolt traversing the split portion of said yoke and arranged to clamp said bearing housing in said yoke, bearings in said bearing housings, a driving wheel mounted in said bearings, and power transmission and braking means associated with said driving wheel.

6. A motorcycle including a frame including a pair of interspaced members at the rear thereof, a steering wheel supporting the front end of said frame, a pair of horizontal bars having one end pivoted on said interspaced frame members and movable with respect thereto, spring means interposed between the free ends of said bars and said frame and adapted to control the movements of said bars, a yoke mounted on one of said horizontal bars, a bearing housing threaded in said yoke, a split yoke fixed on the opposite horizontal bar, a bearing housing having a non-circular position in said yoke, a bolt traversing the split portion of said yoke and arranged to clamp said bearing housing in said yoke, bearings in said bearing housings, a driving wheel mounted in said bearings, and power transmission and braking means associated with said driving wheel.

LESLIE G. NICHOLSON.